US012737897B2

(12) United States Patent
Cronvall et al.

(10) Patent No.: US 12,737,897 B2
(45) Date of Patent: Sep. 15, 2026

(54) OBJECT TRACKING USING PREDICTED POSITIONS

(71) Applicant: QUALCOMM Incorporated, San Diego, CA (US)

(72) Inventors: Per Cronvall, Linköping (SE); Per Albert Siden, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 18/505,839

(22) Filed: Nov. 9, 2023

(65) Prior Publication Data

US 2025/0157053 A1 May 15, 2025

(51) Int. Cl.

| | |
|---|---|
| ***G06T 7/246*** | (2017.01) |
| ***G06F 16/583*** | (2019.01) |
| ***G06T 7/73*** | (2017.01) |

(52) U.S. Cl.

CPC .......... *G06T 7/248* (2017.01); *G06F 16/5854* (2019.01); *G06T 7/74* (2017.01); *G06T 2207/20081* (2013.01); *G06T 2207/20084* (2013.01); *G06T 2207/30196* (2013.01)

(58) Field of Classification Search

CPC . G06T 7/248; G06T 7/74; G06T 2207/20081; G06T 2207/20084; G06T 2207/30196; G06F 16/5854

See application file for complete search history.

(56) References Cited

U.S. PATENT DOCUMENTS

| | | | | |
|---|---|---|---|---|
| 8,873,798 B2 * | 10/2014 | Tsagkatakis | G06F 18/22 382/209 |
| 11,436,752 B1 * | 9/2022 | Rublee | G06T 9/00 |
| 2021/0027431 A1 * | 1/2021 | Ma | G06T 7/50 |
| 2022/0148244 A1 * | 5/2022 | Ko | G06T 11/60 |

FOREIGN PATENT DOCUMENTS

| | | | |
|---|---|---|---|
| CA | 2884383 A1 * | 3/2014 | G06V 40/103 |
| CA | 3044609 A1 * | 2/2020 | G01C 21/18 |

* cited by examiner

*Primary Examiner* — Pinalben Patel

(74) *Attorney, Agent, or Firm* — Polsinelli LLP/QUALCOMM Incorporated

(57) ABSTRACT

Systems and techniques are described herein for tracking objects. For instance, a method for tracking objects is provided. The method may include generating an output embedding based on an object in a first image; obtaining a predicted position of the object in a second image; modifying the output embedding based on the predicted position to generate a modified output embedding; and detecting the object in the second image based on the modified output embedding.

29 Claims, 8 Drawing Sheets

OBJECT TRACKING USING PREDICTED POSITIONS

TECHNICAL FIELD

The present disclosure generally relates to object tracking. For example, aspects of the present disclosure include systems and techniques for object tracking using predicted positions.

BACKGROUND

Object tracking may be an important task for various systems, including, as examples, autonomous vehicles, semi-autonomous vehicles, and robots. Object tracking may involve determining a position of an object and tracking the position over time. By tracking an object, a system may navigate relative to the object (e.g., to avoid the object or to arrive at the object). To track an object, a system may capture successive image frames (e.g., of a video data) of a scene including the object. The system may detect the object in each of the image frames. The system may further determine a position of the object (e.g., relative to the system) based on each of the successive image frames and track the position of the object over time.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for tracking objects. According to at least one example, a method is provided for tracking objects. The method includes: generating an output embedding based on an object in a first image; obtaining a predicted position of the object in a second image; modifying the output embedding based on the predicted position to generate a modified output embedding; and detecting the object in the second image based on the modified output embedding.

In another example, an apparatus for tracking objects is provided that includes at least one memory and at least one processor (e.g., configured in circuitry) coupled to the at least one memory. The at least one processor configured to: generate an output embedding based on an object in a first image; obtain a predicted position of the object in a second image; modify the output embedding based on the predicted position to generate a modified output embedding; and detect the object in the second image based on the modified output embedding.

In another example, a non-transitory computer-readable medium is provided that has stored thereon instructions that, when executed by one or more processors, cause the one or more processors to: generate an output embedding based on an object in a first image; obtain a predicted position of the object in a second image; modify the output embedding based on the predicted position to generate a modified output embedding; and detect the object in the second image based on the modified output embedding.

In another example, an apparatus for tracking objects is provided. The apparatus includes: means for generating an output embedding based on an object in a first image; means for obtaining a predicted position of the object in a second image; means for modifying the output embedding based on the predicted position to generate a modified output embedding; and means for detecting the object in the second image based on the modified output embedding.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
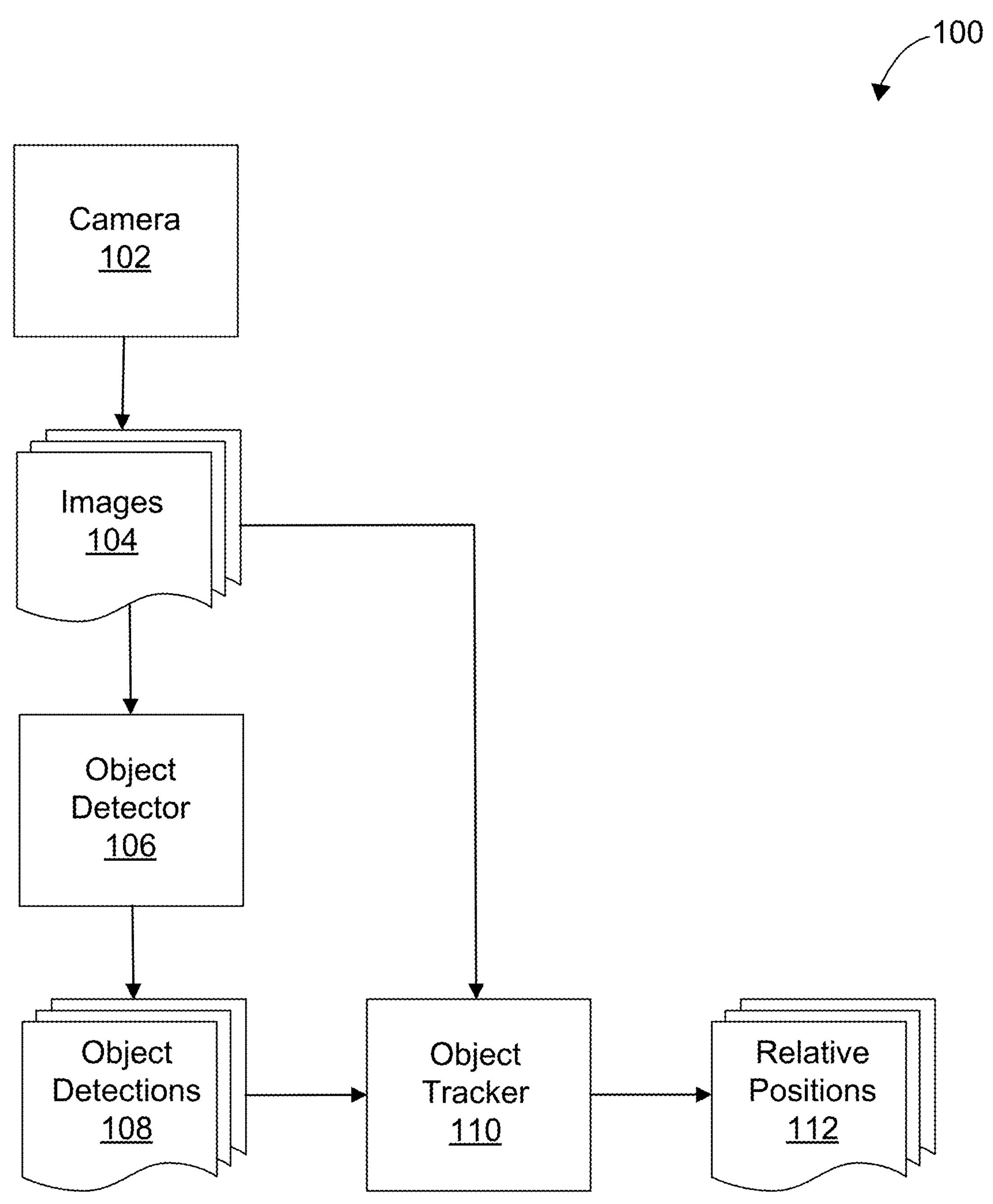
FIG. 1 is a block diagram illustrating an example system for detecting and/or tracking objects, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

One technique for tracking objects uses a detection transformer. A detection transformer may be, or may include, one or more machine-learning models trained to track objects through successive image frames. For example, a detection transformer may include a convolutional neural network (CNN), a transformer encoder, and a transformer decoder. Using the CNN, the transformer encoder, the transformer decoder, and queries, the detection transformer may generate output embeddings that may be, or may include, an implicit representation of objects detected in a given image frame. Such output embeddings may be, or may include, a vector of numerical values that may be interpreted as the implicit representation of the objects. The output embeddings may be decoded, for example, by a bounding-box decoder, to generate bounding boxes. The bounding boxes may be indicative of image coordinates associated with objects in the given image frame. Further, the detection transformer may use the output embeddings of a given image frame as inputs (e.g., as queries) when processing a subsequent image frame. Using output embeddings of the given image frame as inputs when detecting objects in the subsequent image frame may improve detection in the subsequent image frame by focusing the attention of the transformer decoder, when processing the subsequent image frame, based on the position of objects in the given image frame.

Tracking an object between image frames in cases where the object moves by a certain amount between the image frames is challenging for many object-tracking techniques (e.g., including object-tracking techniques using a detection transformer). In one illustrative example, if an objects moves 10% of a frame width between image frames, tracking the object may be challenging for object-tracking techniques. For instance, output embeddings derived from a first image frame by a detection transformer may not be useful to focus the attention of the detection transformer when processing a second image frame if an object moved 10% of the frame width between the first image frame and second image frame.

Object motion between image frames may be the result of the object moving. Additionally or alternatively, if a camera which is capturing the image frames is moving, the motion of the camera between capturing the image frames may result in relative motion of objects in the image frames. For example, the object may appear at different image coordinates in the image frames despite the object remaining stationary in the scene.

Systems, apparatuses, methods (also referred to as processes), and computer-readable media (collectively referred to herein as "systems and techniques") are described herein for object tracking. The systems and techniques described herein may track objects through successive images based on predicted positions of the objects. For example, the systems and techniques may use a detection transformer to track objects through successive image frames. Further, the systems and techniques may modify output embeddings derived from a given image frame and use the modified output embeddings as inputs to the detection transformer when processing a successive image frame. The systems and techniques may modify the output embeddings based on a predicted position of the object in the successive image frame.

In one illustrative example, the systems and techniques may obtain a first image and generate an output embedding based on an object in the first image. For instance, the systems and techniques may provide the first image to a detection transformer and receive, from the detection transformer, the output embedding. Generating the output embedding based on the object may be a step in detecting the object in the first image. For example, detecting an object in an image may include determining image coordinates of the object in the image. To detect an object in an image, a detection transformer may determine an output embedding based on the image and a decoder may generate image coordinates based on the output embedding. A system (e.g., a navigation system of a vehicle, robot, or other system or device) may use the image coordinates to determine a relative position of the object in an environment of the system. The system may navigate in the environment based on the determined relative position.

The systems and techniques may obtain a predicted position of the object in a second image. For example, the systems and techniques may obtain motion information (e.g., indicative of motion of a camera which captured the first image and/or motion of the object). The systems and techniques may predict the position of the object in the second image (e.g., based on the motion information and a time duration between capturing the first frame and the second frame, such as based on a frame-capture rate of the camera).

The systems and techniques may modify the output embedding (derived based on the first image) based on the predicted position of the object in the second image to generate a modified output embedding. Further, the systems and techniques may obtain the second image and detect the object in the second image based on the modified output embedding. For example, the systems and techniques may provide the second image to the detection transformer along with the modified output embedding and receive, from the detection transformer, a second output embedding. In some cases, the second output embedding may be provided to the decoder which may determine second image coordinates based on the second output embedding. A system may use the second image coordinates to determine a relative position of the object in an environment of the system. The system may track the object in the environment (e.g., determining where the object is and/or where the object is heading). The system may navigate in the environment based on the determined relative position.

After determining the second output embedding, the systems and techniques may obtain a predicted position of the object in a third image. The systems and techniques may predict the position of the object in the third image and modify the second output embedding based on the predicted position of the object in the third image to generate a second modified output embedding. Further, the systems and techniques may obtain the third image and detect the object in the third image based on the modified output embedding. The systems and techniques may continue in this way to detect objects in any number of image frames.

By using modified output embeddings (e.g., output embeddings derived based on prior images and modified based on the predicted position of the object in a most-recently obtained image) when determining output embeddings, the systems and techniques may have better performance than other object-detection and/or object-tracking techniques. For example, the systems and techniques may detect and/or track objects in image frames more accurately than other techniques. For example, if an object has been detected in a first frame, and the object is moving between frames, modifying the output embedding from the first frame and using the modified output embedding when processing a second frame (e.g., captured after some relative movement of the object) might allow the object to be detected in the second frame even if the object is occluded in the second frame. In contrast, other techniques that do not modify output embeddings may not be able to detect the object in the second frame, for example, based on the movement of the object between frames. Additionally or alternatively, the systems and techniques may allow for detection and/or tracking that is quicker, uses fewer operations, and/or consumes less power. The detection and/or tracking may be quicker and/or involve fewer operations because the modified output embeddings may provide the detection transformer with information that may focus the attention of the detection transformer based on image coordinates that may be closer to the current position of the object in images. Additionally or alternatively, the systems and techniques may provide information (e.g., through the modified output embeddings) that may focus the attention of the detection transformer with regard to the expected appearance of the object.

Various aspects of the application will be described with respect to the figures below.

FIG. 1 is a block diagram illustrating an example system 100 for detecting and/or tracking objects, according to various aspects of the present disclosure. In general system 100 may obtain images 104, detect objects in images 104, and track the objects. System 100 may be implemented in, for example, a vehicle (e.g., an autonomous or semi-autonomous vehicle) or a robot. The vehicle or robot may use the tracked relative positions of the objects, for example, to navigate. In some aspects, system 100 may predict a relative position of objects based on tracking the objects.

Images 104 may include any number of successive image frames. Images 104 may be captured by a camera 102. (e.g., at a frame-capture rate, such as 30 frames per second). System 100 may provide images 104 to an object detector 106. Object detector 106 may be, or may include, a detection transformer. Object detector 106 may determine object detections 108. Object detections 108 may include image coordinates corresponding to the objects in camera 102. In some cases, object detections 108 may include image coordinates defining bounding boxes which may define pixels of images 104 that represent the objects. Further, object detections 108 may include confidence scores which may indicate a confidence of object detections 108 in the image coordinates and/or a confidence with which downstream algorithms may use object detections 108. System 100 may provide object detections 108 to object tracker 110. Object tracker 110 determine relative positions 112 of objects (e.g., relative to camera 102) based on object detections 108, for example, using three-dimensional geometry. Object tracker 110 may track the relative positions 112 over time (e.g., over the time during which images 104 are captured). A system implementing system 100 may use relative positions 112 to make determinations about navigation.

Figure 2:
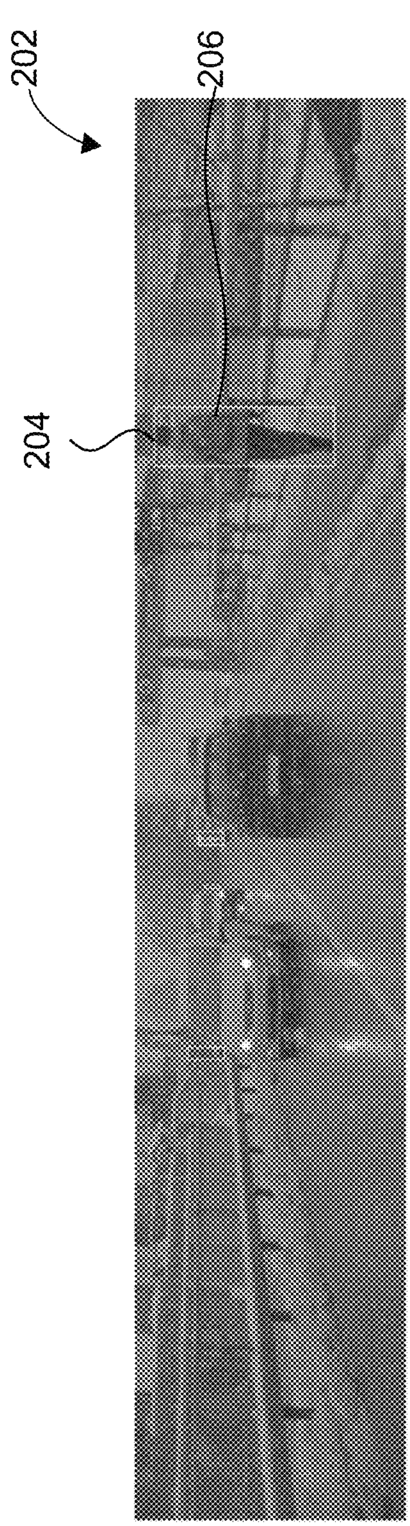
FIG. 2 includes two example images including objects and bounding boxes to illustrate various principles described herein.
Figure 2:
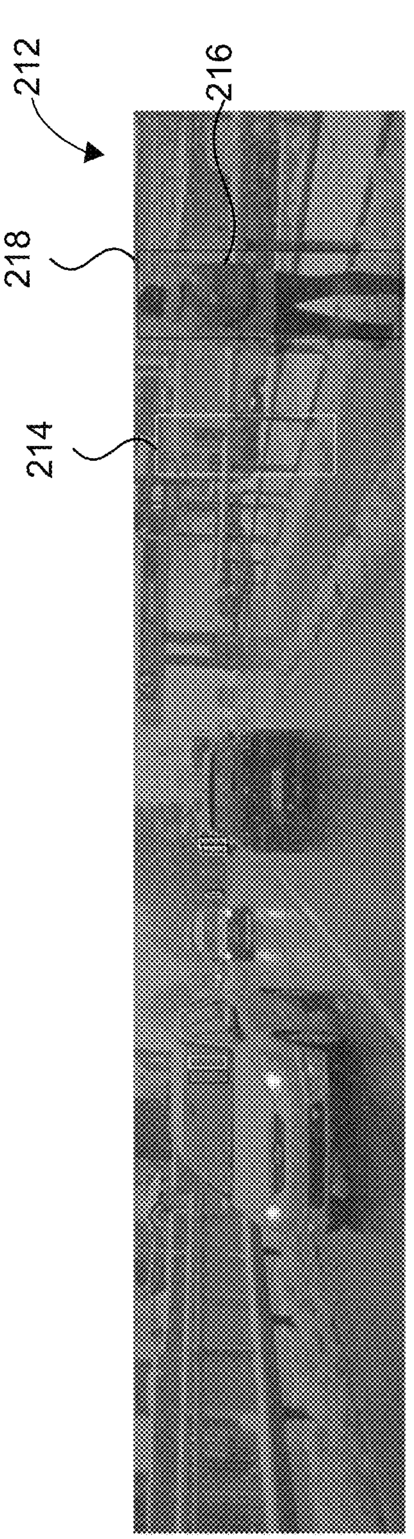

FIG. 2 includes two example images including objects and bounding boxes to illustrate various principles described herein. Image 202 includes a person 206. Person 206 is an example of an object for purposes of the present disclosure. Image 202 is overlaid with a bounding box 204. Bounding box 204 is an example of image coordinates corresponding to person 206 in image 202. For example, bounding box 204 may define pixels in image 202 that represent person 206. Image 202 may be an example of one image of images 104 of FIG. 1. Bounding box 204 may be an example of an object detection of object detections 108 of FIG. 1.

Image 212 includes a person 216, who is an example of an object for the purposes of the present disclosure. Person 216 may be the same person as person 206, however, person 216 may be at different image coordinates within image 212 than person 206 is within image 202, for example, based on movement (e.g., of a camera) between the time image 202 is captured and the time image 212 is captured. Image 202 is overlaid with a bounding box 218 which is an example of image coordinates corresponding to person 216 in image 212. Image 212 may be an example of another image of images 104 of FIG. 1. Bounding box 218 may be an example another object detection of object detections 108 of FIG. 1.

Additionally, image 212 is overlaid with bounding box 214. Bounding box 214 corresponds to bounding box 204. For example, bounding box 214 is based on the image coordinates of bounding box 204 as applied to image 212. If there were no relative motion between the time that image 202 is captured and the time image 212 was captured, person 216 would appear in the same image coordinates in image 212 as person 206 appears in image 202. However, because a camera which captured image 202 and image 212 moved between capturing image 202 and image 212, the image coordinates corresponding to person 206 in image 202 are different than the image coordinates corresponding to person 216 in image 212.

If a detection transformer were provided with an output embedding corresponding to bounding box 204 (e.g., as a query), along with image 202, the output embedding may aid the detection transformer in detecting person 206 in image 202. For example, an output embedding based on bounding box 204 may focus the attention of a transformer decoder to detect person 206 in image 202. However, if a detection transformer were provided with an output embedding corresponding to bounding box 214, along with image 212, the output embedding may not aid the detection transformer in detecting person 216 in image 212. For example, an output embedding based on bounding box 214 may not be useful in focusing the attention of a transformer decoder to detect person 216 in image 212.

The systems and techniques may determine an output embedding that may correspond to bounding box 218 and provide such an output embedding to a detection transformer along with image 212. For example, the systems and techniques may predict a position of person 216 in image 212 (e.g., the systems and techniques may predict a position of bounding box 218). Further the systems and techniques may modify an output embedding derived based on bounding box 204 to be more like an output embedding based on bounding box 218. The systems and techniques may provide the modified output embedding to a detection transformer to detect person 216 in image 212.

An output embedding related to bounding box 218 (e.g., an output embedding based on bounding box 204 and modified to be more like if the output embedding were based on bounding box 218) may aid the detection transformer in detecting person 216 in image 212. For example, an output embedding related to bounding box 218 may focus the attention of a transformer decoder to detect person 216 in image 212. Detecting person 216 in image 212 using an output embedding related to bounding box 218 may be more accurate, quicker, involve fewer operations, and/or consume less power than detecting person 216 in image 212 without using the output embedding.

Figure 3:
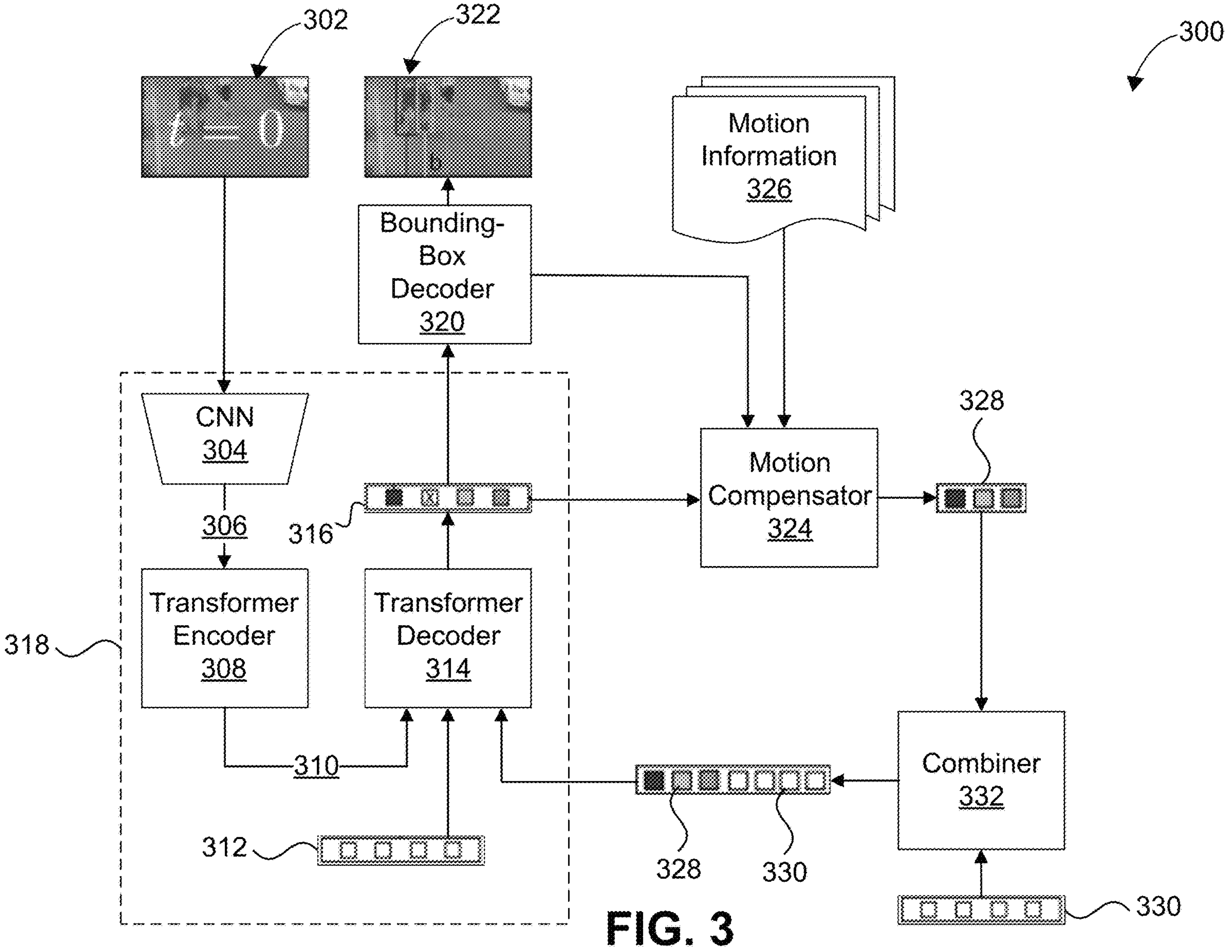
FIG. 3 is a block diagram illustrating an example system 300 for detecting and/or tracking objects, according to various aspects of the present disclosure.

FIG. 3 is a block diagram illustrating an example system 300, for detecting and/or tracking objects, according to various aspects of the present disclosure. In general, system 300 may obtain an image 302 and determine output embeddings 316 based on objects represented by pixels of image 302. For example, Convolutional Neural Network 304 (CNN 304) may determine features 306 based on image 302, transformer encoder 308 may determine image features 310 based on features 306, and transformer decoder 314 may determine output embeddings 316 based on image features 310 and queries 312. Bounding-box decoder 320 may decode the output embeddings 316 to generate bounding boxes 322. Additionally, motion compensator 324 may modify output embeddings 316 based on predicted positions of the objects in image 302 to generate modified output embeddings 328. System 300 may receive a subsequent image (not illustrated in FIG. 3) and determine subsequent output embeddings (not illustrated in FIG. 3) based on the subsequent image and modified output embeddings 328. For example, CNN 304 may determine subsequent features (not illustrated in FIG. 3) based on the subsequent image, transformer encoder 308 may determine subsequent image features (not illustrated in FIG. 3) based on the subsequent features, and transformer decoder 314 may determine the subsequent output embeddings based on the subsequent image features and modified output embeddings 328.

Image 302 may be an image of a number of successive image frames (e.g., of video data). Image 302 may include pixels that represent various objects (e.g., people and/or cars). Image 302 may be captured by a camera of a system that implements system 300.

CNN 304 may be trained to generate features (e.g., features 306) based on images (e.g., image 302). Transformer encoder 308 may be, or may include, an encoder neural network trained to generate image features (e.g., image features 310) based on features (e.g., features 306). Transformer decoder 314 may be, or may include, a decoder network, for example, an attention decoder network trained to generate output embeddings (e.g., output embeddings 316) based on image features (e.g., image features 310) and queries (e.g., queries 312). CNN 304, transformer encoder 308, and transformer decoder 314, arranged and implemented in system 300 may constitute a detection transformer 318.

CNN 304, transformer encoder 308, queries 312, and transformer decoder 314 may be trained in an end-to-end training procedure in which CNN 304, transformer encoder 308, transformer decoder 314, and/or queries 312 are trained together. The training procedure may be a back-propagation training procedure. For example, a corpus of training data may include a number of images and a number of bounding boxes associated with objects in each of the number of images. The number of images may be provided to CNN 304 one at a time. For example, a given image may be provided to CNN 304. CNN 304 may generate a feature based on the given image and provide the feature to transformer encoder 308. Transformer encoder 308 may generate image features based on the feature and provide the image features to transformer decoder 314. Transformer decoder 314 may additionally receive (or store) queries. Transformer decoder 314 may generate output embeddings based on the image features and the queries. A bounding-box decoder (e.g., bounding-box decoder 320) may generate bounding boxes based on the output embeddings. The generated bounding boxes may be compared with bounding boxes of the training data that correspond to the given image. A difference (e.g., an error) may be determined between the generated bounding boxes and the bounding boxes of the training data (e.g., the ground truth). Parameters (e.g., weights) of each of CNN 304, transformer encoder 308, and transformer decoder 314, and/or queries 312 may be adjusted based on the difference. The parameters may be adjusted such that in future iterations of the training procedure (e.g., based on further images of the corpus of training data) the output embeddings result in bounding boxes that are more similar to the provided bounding boxes. Such adjustments may be made according to a gradient descent technique or another loss minimization technique. After a number (e.g., thousands) of iterations of the training procedure, CNN 304, transformer encoder 308, and transformer decoder 314 may be trained to receive images and generate output embeddings that relate to bounding boxes of objects in the images. After training, CNN 304, transformer encoder 308, transformer decoder 314, and/or queries 312 may be deployed in system 300. Thus, CNN 304, transformer encoder 308, transformer decoder 314, and/or queries 312 may be trained to generate output embeddings 316 based on image 302.

CNN 304, transformer encoder 308, and transformer decoder 314 collectively, may detect objects by querying transformer decoder 314 with queries 312. Queries 312 may include a fixed number of queries for each frame (e.g., 500). Each of queries 312 may focus on a certain aspect of the object type of interest, such as, different appearances or sizes. Each of queries 312 may be, or may include, a vector which is fixed across frames. The output of transformer decoder 314 for each of queries 312 is an output embedding of output embeddings 316. Each of output embeddings 316 may be, or may include, an embedding vector than may be decoded (e.g., by bounding-box decoder 320) into object coordinates and scores.

Bounding-box decoder 320 may receive output embeddings 316 and may generate bounding boxes 322 based thereon. Bounding-box decoder 320 may be, or may include, a linear predictor. Bounding boxes 322 may be, or may include, image coordinates indicative of objects in image 302. For example, bounding boxes 322 may include image coordinates of a center of a bounding box and dimensions of the bounding box or images coordinates of corners of a bounding box. The bounding box may be indicative of pixels of image 302 that represent respective objects. Bounding boxes 322 are illustrated in FIG. 3 as overlaid onto image 302 for illustrative purposes. In some aspects, bounding boxes 322 may not include image data (e.g., values of pixels) but rather include image coordinates. In some aspects, bounding-box decoder 320 may generate confidence values corresponding to each of the bounding boxes 322. For example, bounding-box decoder 320 may generate a value (e.g., between 0 and 1) which may indicate a confidence of system 300 in bounding boxes 322. The confidence values may be indicative of a degree of confidence system 300 has in bounding boxes 322 and/or a degree of confidence other systems or devices may use bounding boxes 322.

Additionally, motion compensator 324 may modify output embeddings 316 to generate modified output embeddings 328. Motion compensator 324 may perform motion compensation on track queries. For example, motion compensator 324 may modify output embeddings 316 based on a predicted position of one or more objects in a subsequent image (e.g., an image subsequent to image 302).

In some aspects, motion compensator 324 may receive a predicted position of one or more objects in the subsequent image from another system, device, or module. For example, motion information 326 may include predictions regarding positions of objects in the subsequent image.

In some aspects, motion compensator 324 may predict a position of one or more objects in the subsequent image. For example, motion compensator 324 may receive motion information 326 and/or position information from bounding-box decoder 320 and may determine predictions based thereon. For example, motion information 326 may include ego-motion data indicative of a motion of a camera which captured image 302 and which may capture subsequent image frames. For example, motion information 326 may include a speed of a vehicle including the camera. Motion compensator 324 may have information of a frame-capture rate of the camera and may calculate how far the vehicle may move between frames. Motion compensator 324 may further calculate where, in image coordinates, a bounding box may move based on the movement of the vehicle.

Additionally or alternatively, motion information 326 may include object-motion data indicative of motion of one or more objects represented by image 302. For example, motion compensator 324 may include a tracking algorithm that may track objects over time and may determine a prediction regarding motion of the one or more objects in upcoming image frames. Further, motion compensator 324 may calculate how far in image coordinates a bounding box may move based on the movement of the object.

As an example, motion compensator 324 (or another system, device, or module) may determine ego-motion data indicative of motion of the camera. The ego-motion data may be determined using, for example, accelerometers, speedometers, global-positioning system data, visual odometry and/or camera calibration. Additionally or alternatively, motion compensator 324 (or another system, device, or module) may determine intrinsic and/or extrinsic parameters of the camera.

Motion compensator 324 (or another system, device, or module) may determine positions of detected objects (e.g., in world coordinates or relative to the camera). In some aspects, the positions of the determined using light detection and ranging (LIDAR), radio detection and ranging (RADAR), stereo cameras and/or monocular cameras, for example.

As an example, a monocular camera may capture an image of an object. A lateral pixel displacement of the object and the image may be used to determine a relative yaw angle from the camera to the object. A height of the object may be assumed (e.g., 1.7 meters). In some cases, the assumed height may be based, as least in part, based on an object-identification technique. For example, the object may be identified as a person and the height of the person may be assumed to be 1.7 meters based on the object being identified as a person. A pixel height of the object may be used to determine a distance between the camera and the object. For example, an object laterally offset 400 pixels from a center of the image, and with a pixel height of 100 pixels, may be determined to be 30 degrees off-center and 50 meters away from a camera which capture the image.

Regardless of the source of the predicted positions of the objects, motion compensator 324 may modify output embeddings 316 based on the predicted positions of the objects. However, motion compensating a track query is not straightforward since the coordinates of an object are not explicitly encoded in the query vector. For example, output embeddings 316 does not explicitly represent the image coordinates or the position of objects. It is by decoding output embeddings 316 (e.g., using bounding-box decoder 320) that the image coordinates become explicit.

For example, bounding box coordinates b (which are an example of image coordinates of an object) may be obtained from a bounding-box decoder of a detector neural network, based on an output embedding o. In other words:

$$b=\text{BBoxDecoder}(o)$$

Motion compensator 324 may compensate for motion of a detected object (e.g., relative motion including ego motion of a camera and/or object motion) by determining the smallest modification, δ, of the output embedding o that results in the decoded image coordinates matching the motion compensated coordinates b'. This may involve determining the least norm solution δ to:

$$BBoxDecoder(o+\delta)=b'$$

In some aspects, the bounding-box decoder may be, or may include, a linear-predictor bounding-box decoder B. In this case, the problem is described by an underdetermined linear equation system:

$$B(o+\delta)=b'$$

The least-norm solution (the solution with smallest δ in vector norm sense) of:

$$B(o+\delta)=b'$$

may always exist and may be computed by:

$$\delta=B^T\left(BB^T\right)^{-1}(b'-Bo)$$

In the general case (e.g., when B is not a linear function), δ can still be determined. But a more expensive optimization method may need to be used, for example, gradient descent.

Having determined δ (whether B is a linear function or not), motion compensator 324 may generate a motion-compensated track query:

$$q = o + \delta$$

Alternatively, motion compensator 324 may determine a motion compensated track query q by learning a mapping $f_\theta$ from the original track query/output embedding o and the motion information m. For example:

$$q = f_\theta(o, m)$$

The mapping $f_\theta$ can parametrized using a neural network module and trained together with the rest of the object detection network to minimize the associated detection loss. In other words, the mapping function $f_\theta$ may involve an end-to-end training. The motion information m can be represented in various ways, including: m can be the motion vector associated with the bounding box, for example center (b')–center(b), m could also include absolute information about the compensated box position m', m could also contain global information about the camera's ego motion, for example translations and rotations of the camera. An additional loss term L could be added for each track query to encourage finding compensated track queries q approximating the least norm solution previously described, for example:

$$L = (BBoxDecoder(q) - b')^2$$

In other words, in some aspects, motion compensator 324 may be, or may include, a machine-learning model (e.g., a neural network) that may be trained to generate modified output embeddings 328 based on output embeddings 316 and motion information 326. In such cases, motion compensator 324 may be included in the end-to-end training of CNN 304, transformer encoder 308, and transformer decoder 314. In such cases, the loss function may be adjusted by the inclusion of the loss term L.

Having determined modified output embeddings 328, combiner 332 may combine modified output embeddings 328 with queries 330 and provide the combined modified output embeddings 328 and queries 330 to transformer decoder 314 for use with a subsequent image. In some aspects, queries 330 may be the same as queries 312. For example, queries 312 may be generated through training (e.g., through the training process described above). As such, queries 312 may be applied to all images and queries 330 may be the same as queries 312. In some aspects, combiner 332 may concatenate modified output embeddings 328 with queries 330.

In some aspects, system 300 may extend the queries (e.g., queries 312) with track queries (e.g., modified output embeddings 328 and/or queries 330) . . . . Track queries may be, or may include, modified output embeddings 328 from transformer decoder 314 from detections in earlier frames. Propagating queries between frames, rather than propagating image data, may conserve bandwidth, which may make system 300 and the techniques associated with system 300 suitable for embedded systems.

Transformer decoder 314 may use modified output embeddings 328 and queries 330 when processing a subsequent image (e.g., an image received subsequent to image 302). For example, system 300 may receive a series of images (e.g., one at a time). System 300 may generate output embeddings for each of the embeddings (e.g., as they are received). Further, bounding-box decoder 320 may generate bounding boxes based on the output embeddings. For each set of output embeddings generated, motion compensator 324 may modify the output embeddings to generate respective modified output embeddings and provide the modified output embeddings to transformer decoder 314 to use to process a subsequent one of the series of images.

Figure 4:
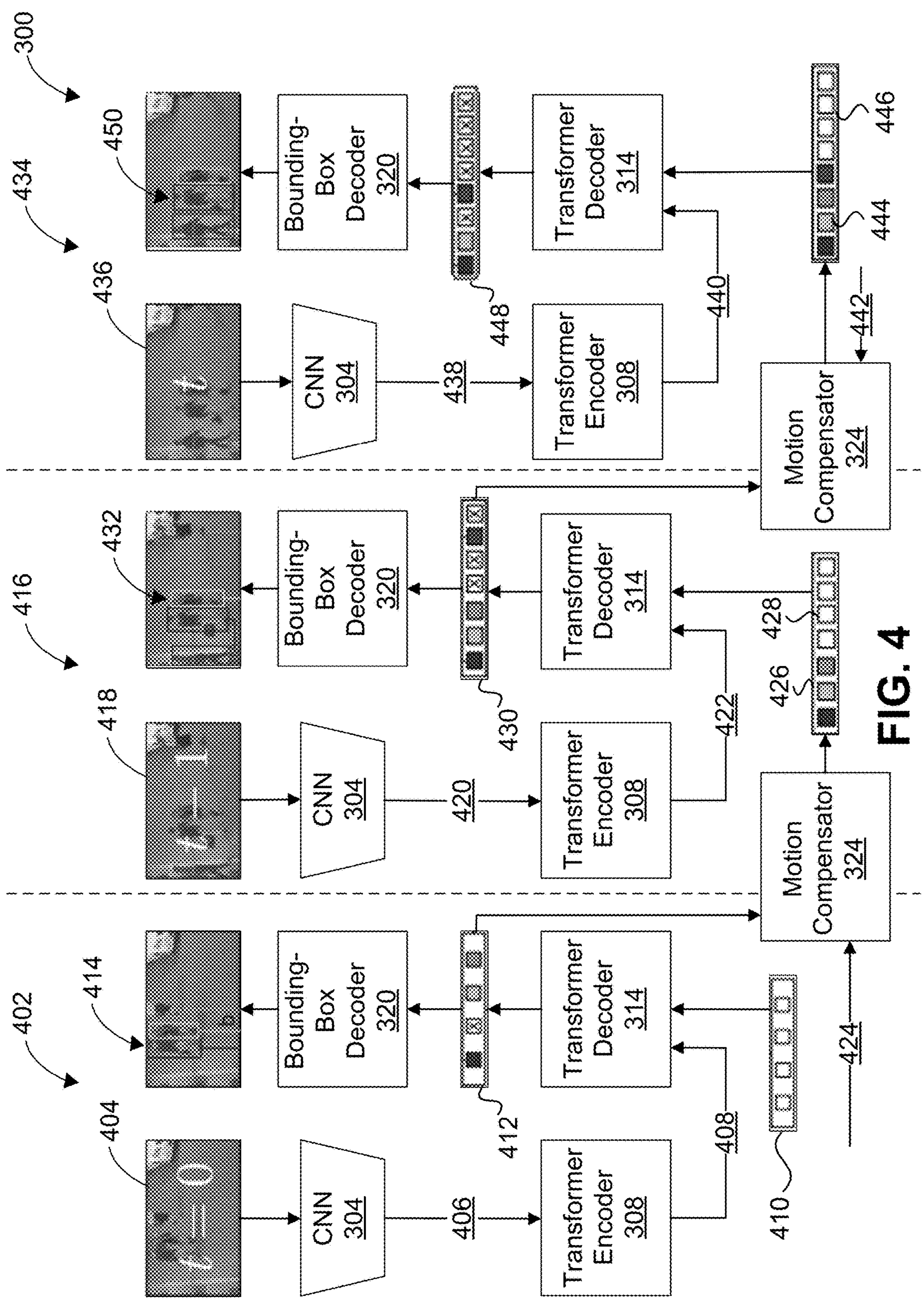
FIG. 4 is a block diagram illustrating another view of the system of FIG. 3, according to various aspects of the present disclosure.

For example, FIG. 4 is a block diagram illustrating another view of system 300 of FIG. 3, according to various aspects of the present disclosure. For instance, FIG. 4 includes multiple representations of CNN 304, transformer encoder 308, transformer decoder 314, bounding-box decoder 320, and motion compensator 324. Each of the representations correspond to one of a time 402, a time 416, and a time 434.

At time 402 (or during a time duration related to time 402), an image 404 may be received. CNN 304 may process image 404 to generate features 406, transformer encoder 308 may process features 406 to generate image features 408, and transformer decoder 314 may process image features 408 based on queries 410 to generate output embeddings 412. In some aspects, during time 402 bounding-box decoder 320 may generate bounding boxes 414 based on output embeddings 412.

After transformer decoder 314 generates output embeddings 412, motion compensator 324 may generate modified output embeddings 426 based on output embeddings 412 and motion information 424. Motion information 424 may be the same as, or may be substantially similar to, motion information 326 of FIG. 3, but specific to time 402. Modified output embeddings 426 may be combined with queries 428 (e.g., by a combiner such as combiner 332). Similar to that described above, queries 428 may be the same as, or may be substantially similar to, queries 410.

At time 416 (or during a time duration related to time 416), an image 418 may be received. CNN 304 may process image 418 to generate features 420 and transformer encoder 308 may process features 420 to generate image features 422. Further, transformer decoder 314 may process image features 422 based on modified output embeddings 426 (which was generated by motion compensator 324 based on output embeddings 412 and motion information 424) and queries 428 to generate output embeddings 430. In some aspects, during time 416, bounding-box decoder 320 may generate bounding boxes 432 based on output embeddings 430.

After transformer decoder 314 generates output embeddings 430, motion compensator 324 may generate modified output embeddings 444 based on output embeddings 430 and motion information 442. Motion information 442 may be the same as, or may be substantially similar to, motion information 326 of FIG. 3, but specific to time 416. Modified output embeddings 444 may be combined with queries 446 (e.g., by a combiner such as combiner 332). Similar to that described above, queries 446 may be the same as, or may be substantially similar to, queries 410.

At time 434 (or during a time duration related to time 434), an image 436 may be received. CNN 304 may process image 436 to generate features 438 and transformer encoder 308 may process features 438 to generate image features 440. Further, transformer decoder 314 may process image features 440 based on modified output embeddings 444 (which was generated by motion compensator 324 based on output embeddings 430 and motion information 442) and queries 446 to generate output embeddings 448. In some aspects, during time 434 bounding-box decoder 320 may generate bounding boxes 450 based on output embeddings 448.

After transformer decoder 314 generates output embeddings 448, motion compensator 324 may generate further modified output embeddings (not illustrated in FIG. 4) based on output embeddings 448 and further motion information (not illustrated in FIG. 4). The further modified output embeddings may be provided to transformer decoder 314 along with queries for transformer decoder 314 to generate further output embeddings corresponding to further images.

In some aspects, an object tracker (e.g., object tracker 110 of FIG. 1) may track one or more objects based on bounding boxes 414, bounding boxes 432, and bounding boxes 450. A system may use the detections (e.g., of bounding boxes 414, bounding boxes 432, and/or bounding boxes 450) and/or the tracks determined by the object tracker, for example, to navigate.

Figure 5:
FIG. 5 is a flow diagram illustrating another example process for detecting and/or tracking objects, in accordance with aspects of the present disclosure.
Figure 5:
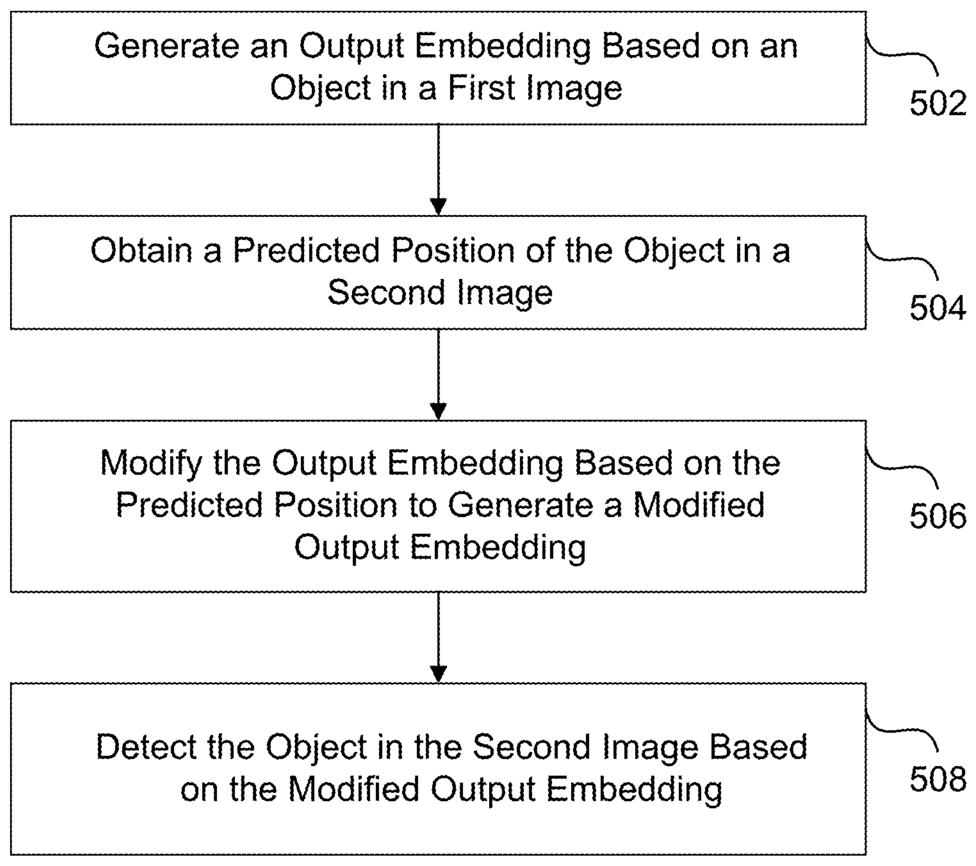

FIG. 5 is a flow diagram illustrating a process 500 for detecting and/or tracking objects, in accordance with aspects of the present disclosure. One or more operations of process 500 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 500. The one or more operations of process 500 may be implemented as software components that are executed and run on one or more processors.

At block 502, a computing device (or one or more components thereof) may generate an output embedding based on an object in a first image. For example, system 300 of FIG. 3 and FIG. 4 (including CNN 304, transformer encoder 308, transformer decoder 314, bounding-box decoder 320, and/of motion compensator 324) may generate output embeddings 412 (e.g., at time 402) based on an object in image 404.

In some aspects, the output embedding may be associated with detection of the object in the first image. For example, the output embedding may be decoded into image coordinates that may be used to detect the object. For example, output embeddings 412 may be decodable into bounding boxes 414.

In some aspects, to generate the output embedding, the computing device (or one or more components thereof) may provide the first image to an object-detection machine-learning model; and receive, from the object-detection machine-learning model, the output embedding based on the first image. In some aspects, the object-detection machine-learning model may be, or may include, a detection transformer. In some aspects, the object-detection machine-learning model may be, or may include, a convolutional neural network (CNN) to generate features based on images; a transformer encoder to generate image features based on the features; and a transformer decoder to generate output embeddings based on the image features and queries. For example, system 300 may provide image 404 to detection transformer 318, which may be, or may include, a machine-learning model, for example, including CNN 304, transformer encoder 308, and transformer decoder 314. Detection transformer 318 may generate output embeddings 412.

At block 504, the computing device (or one or more components thereof) may obtain a predicted position of the object in a second image. For example, motion compensator 324 may determine or obtain a predicted position of the object in image 418 (e.g., at time 416).

In some aspects, the predicted position of the object in the second image is based on relative motion data. In some aspects, the relative motion data is based on at least one of ego-motion data that is indicative of motion of a camera associated with the first image and the second image or object-motion data that is indicative of motion of the object. In some aspects, the computing device (or one or more components thereof) may determine a position of the object in the first image. The predicted position of the object in the second image may be based on the position of the object in the first image. In some aspects, the computing device (or one or more components thereof) may determine a relative position of the object relative to a camera associated with the first image based on the position of the object in the first image; and generate the predicted position of the object in the second image based on the relative position of the object. In some aspects, the predicted position of the object in the second image may be further based on at least one of ego-motion data that is indicative of motion of a camera associated with the first image and the second image or object-motion data that is indicative of motion of the object. In some aspects, the predicted position of the object in the second image is based on at least one of: a position of the object in the first image; a relative position of the object relative to a camera associated with the first image and the second image; ego-motion data indicative of motion of the camera associated with the first image and the second image; or object-motion data indicative of motion of the object. For example, motion compensator 324 may predict the position of objects in image 404 (image 418, and/or image 436) based on the position of the objects in prior images and/or based on motion information 424 and/or motion information 442. Motion information 424 and motion information 442 may include ego motion data (e.g., indicative of motion of a camera that captures image 404, image 418 and image 436) and/or target motion (e.g., indicative of motion of objects in the images).

At block 506, the computing device (or one or more components thereof) may modify the output embedding based on the predicted position to generate a modified output embedding. For example, motion compensator 324 may modify output embeddings 412 based on the predicted position to generate modified output embeddings 426.

In some aspects, the modification to the output embedding is determined based on a least-norm solution to an undetermined linear equation system. The undetermined linear equation system may be based on a decoder. For example, motion compensator 324 may determine the modification to output embeddings 412 based on bounding-box decoder 320. The problem may be described by an underdetermined linear equation system:

$$B(o+\delta)=b'$$

The least-norm solution (the solution with smallest δ in vector norm sense) of:

$$B(o+\delta)=b'$$

may always exist and may be computed by:

$$\delta=B^T\left(BB^T\right)^{-1}(b'-Bo)$$

In some aspects, the modification to the output embedding may be determined using a gradient-descent technique.

At block 508, the computing device (or one or more components thereof) may detect the object in the second image based on the modified output embedding. For example, transformer decoder 314 may, based on modified output embeddings 426, determine output embeddings 430 (which may include implicit representations of a detection of the object in image 418). Further, bounding-box decoder 320 may decode output embeddings 430 to generate bounding boxes 432. An object tracker (e.g., object detector 106 of FIG. 1) may detect objects based on the bounding boxes and the images.

In some aspects, the output embedding may be a first output embedding. To detect the object in the second image, the computing device (or one or more components thereof) may provide the second image and the modified output embedding to an object-detection machine-learning model and receive, from the object-detection machine-learning model, a second output embedding based on the second image and the modified output embedding. For example, output embeddings 412 may be a first output embedding. System 300 may modify output embeddings 412 to generate queries 428. System 300 may provide image 418 and queries 428 to an object-detection machine-learning model (e.g., including CNN 304, transformer encoder 308, and transformer decoder 314, such as illustrated and described with regard to detection transformer 318 of FIG. 3). System 300 may receive, from the object-detection machine-learning model, output embeddings 430 based on image 418 and queries 428. In some aspects, the modified output embedding may be provided to the object-detection machine-learning model as a query. For example, system 300 may provide queries 428 to transformer decoder 314 as a query.

In some aspects, the object-detection machine-learning model, may be, or may include, a detection transformer. In some aspects, the object-detection machine-learning model may be, or may include, a convolutional neural network (CNN) to generate features based on images; a transformer encoder to generate image features based on the features; and a transformer decoder to generate output embeddings based on the image features and queries. For example, detection transformer 318 of FIG. 3 includes CNN 304, transformer encoder 308, and transformer decoder 314. CNN 304 may generate features 306 based on image 302. Transformer encoder 308 may generate image features 310 based on features 306. Transformer decoder 314 may generate output embeddings 316 based on image features 310 and queries 312.

In some aspects, the computing device (or one or more components thereof) may provide the second output embedding to a decoder; and receive, from the decoder, image coordinates corresponding to the object in the second image based on the second output embedding. For example, system 300 may provide output embeddings 430 to bounding-box decoder 320 and receive image coordinates (e.g., of bounding boxes 432) from bounding-box decoder 320. In some aspects, the image coordinates may be indicative of a bounding box associated with the object. In some aspects, the decoder may be, or may include, a linear predictor configured to generate image coordinates based on output embeddings. For example, bounding-box decoder 320 may be, or may include, a linear predictor. In some aspects, the first image coordinates may be indicative of a first bounding box associated with the object and the second image coordinates may be indicative of a second bounding box associated with the object.

In some aspects, the computing device (or one or more components thereof) may decode, using a decoder, the output embedding to generate first image coordinates corresponding to the object in the first image. The predicted position of the object in the second image may be, or may include, second image coordinates corresponding to the predicted position of the object in the second image. To modify the output embedding, the computing device (or one or more components thereof) may determine a modification to the output embedding that results in the modified output embedding being decodable by the decoder to generate the second image coordinates. For example, bounding-box decoder 320 may decode output embeddings 412 to generate bounding boxes 414 which may correspond to positions of objects in image 404. Motion compensator 324 may modify output embeddings 412 to generate modified output embeddings 426 such that output embeddings 430 (which is generates based on image features 422 and modified output embeddings 426) are decodable (e.g., by bounding-box decoder 320) to generate bounding boxes 432 that correspond to positions of the objects in image 418.

In some aspects, the output embedding may be, or may include, a first output embedding. The predicted position may be, or may include, a first predicted position. The modified output embedding may be, or may include, a first modified output embedding. To detect the object in the second image, the computing device (or one or more components thereof) may generate a second output embedding based on the object in the second image. The computing device (or one or more components thereof) may further: obtain a second predicted position of the object in a third image; modify the second output embedding based on the second predicted position to generate a second modified output embedding; and detect the object in a third image based on the second modified output embedding. For example, system 300 may generate output embeddings 412, which may be first output embedding, based on image 404, which may be obtained at time 402. Further, system 300 may predict a position of an object (in image 418, which may be captured at time 416) based on output embeddings 412 (and/or based on bounding boxes 414 which are based on output embeddings 412). The predicted position may be a first predicted position. System 300 may further modify output embeddings 412 based on the first predicted position to generate modified output embeddings 426, which may be a first modified output embedding. System 300 may obtain image 418, which may be a second image. System 300 may generate output embeddings 430 based on image 418 (and based on modified output embeddings 426, the first modified output embedding). Output embeddings 430 may be a second output embedding. System 300 may predict a position of the object (in image 436, which may be captured at time 434) based on output embeddings 430 (and/or based on bounding boxes 432 which are based on output embeddings

430). The predicted position may be a second predicted position. System 300 may modify output embeddings 430 based on the second predicted position to generate modified output embeddings 444, which may be a second modified output embedding. System 300 may detect the object in image 436 based on modified output embeddings 444. For example, system 300 may generate output embeddings 448 based on image 436 and modified output embeddings 444 (e.g., using modified output embeddings 444 as a query) and generate bounding boxes 450 based on output embeddings 448.

In some examples, as noted previously, the methods described herein (e.g., process 500 of FIG. 5, and/or other methods described herein) can be performed, in whole or in part, by a computing device or apparatus. In one example, one or more of the methods can be performed by system 100, object detector 106, and/or object tracker 110 of FIG. 1, and/or system 300, CNN 304, transformer encoder 308, transformer decoder 314, detection transformer 318, bounding-box decoder 320, motion compensator 324, and/or combiner 332 of FIG. 3 and FIG. 4, or by another system or device. In another example, one or more of the methods (e.g., process 500 of FIG. 5, and/or other methods described herein) can be performed, in whole or in part, by the computing-device architecture 800 shown in FIG. 8. For instance, a computing device with the computing-device architecture 800 shown in FIG. 8 can include, or be included in, the components of the system 100, object detector 106, object tracker 110, system 300, CNN 304, transformer encoder 308, transformer decoder 314, detection transformer 318, bounding-box decoder 320, motion compensator 324, and/or combiner 332, and can implement the operations of process 500, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 500, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 500, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 6:
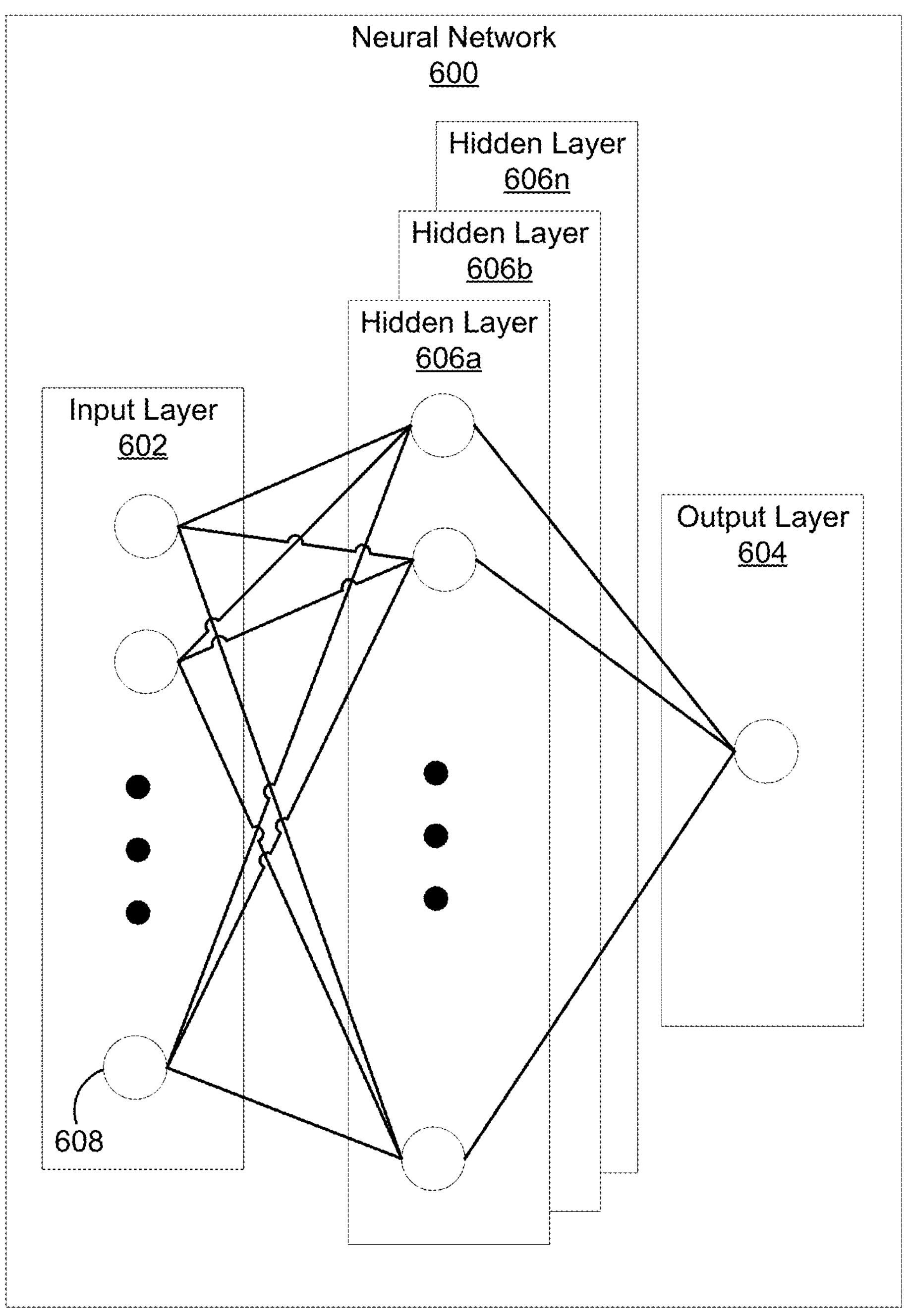
FIG. 6 is a block diagram illustrating an example of a deep learning neural network that can be used to implement a perception module and/or one or more validation modules, according to some aspects of the disclosed technology.

FIG. 6 is an illustrative example of a neural network 600 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 600 may be an example of, or can implement, object detector 106 and/or object detections 108 of FIG. 1, and/or CNN 304, transformer encoder 308, transformer decoder 314, detection transformer 318, bounding-box decoder 320, motion compensator 324, and/or combiner 332 of FIG. 3 and FIG. 4.

An input layer 602 includes input data. In one illustrative example, input layer 602 can include data representing images 104 of FIG. 1, image 302, features 306, image features 310, queries 312, output embeddings 316, motion information 326 and/or queries 330 of FIG. 3 and/or image 404, features 406, image features 408, queries 410, output embeddings 412, image 418, features 420, image features 422, motion information 424 modified output embeddings 426, queries 428, image 436, features 438, image features 440, motion information 442, modified output embeddings 444, and/or queries 446, of FIG. 4.

FIG. 4. Neural network 600 includes multiple hidden layers hidden layers 606*a*, 606*b*, through 606*n*. The hidden layers 606*a*, 606*b*, through hidden layer 606*n* include "n" number of hidden layers, where "n" is an integer greater than or equal to one. The number of hidden layers can be made to include as many layers as needed for the given application. Neural network 600 further includes an output layer 604 that provides an output resulting from the processing performed by the hidden layers 606*a*, 606*b*, through 606*n*. In one illustrative example, output layer 604 can provide object detections 108 and/or relative positions 112 of FIG. 1, features 306, image features 310, output embeddings 316, bounding boxes 322, and/or modified output embeddings 328, of FIG. 3, and/or features 406, image features 408, output embeddings 412, bounding boxes 414, features 420, image features 422, output embeddings 430, bounding boxes 432, features 438, image features 440, output embeddings 448, and/or bounding boxes 450 of FIG. 4.

Neural network 600 may be, or may include, a multi-layer neural network of interconnected nodes. Each node can represent a piece of information. Information associated with the nodes is shared among the different layers and each layer retains information as information is processed. In some cases, neural network 600 can include a feed-forward network, in which case there are no feedback connections where outputs of the network are fed back into itself. In some cases, neural network 600 can include a recurrent neural network, which can have loops that allow information to be carried across nodes while reading in input.

Information can be exchanged between nodes through node-to-node interconnections between the various layers. Nodes of input layer 602 can activate a set of nodes in the first hidden layer 606*a*. For example, as shown, each of the input nodes of input layer 602 is connected to each of the nodes of the first hidden layer 606*a*. The nodes of first hidden layer 606*a* can transform the information of each input node by applying activation functions to the input node information. The information derived from the transformation can then be passed to and can activate the nodes of the next hidden layer 606*b*, which can perform their own designated functions. Example functions include convolutional, up-sampling, data transformation, and/or any other suitable functions. The output of the hidden layer 606*b* can then activate nodes of the next hidden layer, and so on. The output of the last hidden layer 606*n* can activate one or more nodes of the output layer 604, at which an output is provided. In some cases, while nodes (e.g., node 608) in neural network 600 are shown as having multiple output lines, a node has a single output and all lines shown as being output from a node represent the same output value.

In some cases, each node or interconnection between nodes can have a weight that is a set of parameters derived from the training of neural network 600. Once neural network 600 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 600 to be adaptive to inputs and able to learn as more and more data is processed.

Neural network 600 may be pre-trained to process the features from the data in the input layer 602 using the different hidden layers 606*a*, 606*b*, through 606*n* in order to provide the output through the output layer 604. In an example in which neural network 600 is used to identify features in images, neural network 600 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 600 is trained well enough so that the weights of the layers are accurately tuned.

For the example of identifying objects in images, the forward pass can include passing a training image through neural network 600. The weights are initially randomized before neural network 600 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 600, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 600 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total}=\Sigma\frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 600 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 600 can include any other deep network other than a CNN, such as an autoencoder, a deep belief nets (DBNs), a Recurrent Neural Networks (RNNs), among others.

Figure 7:
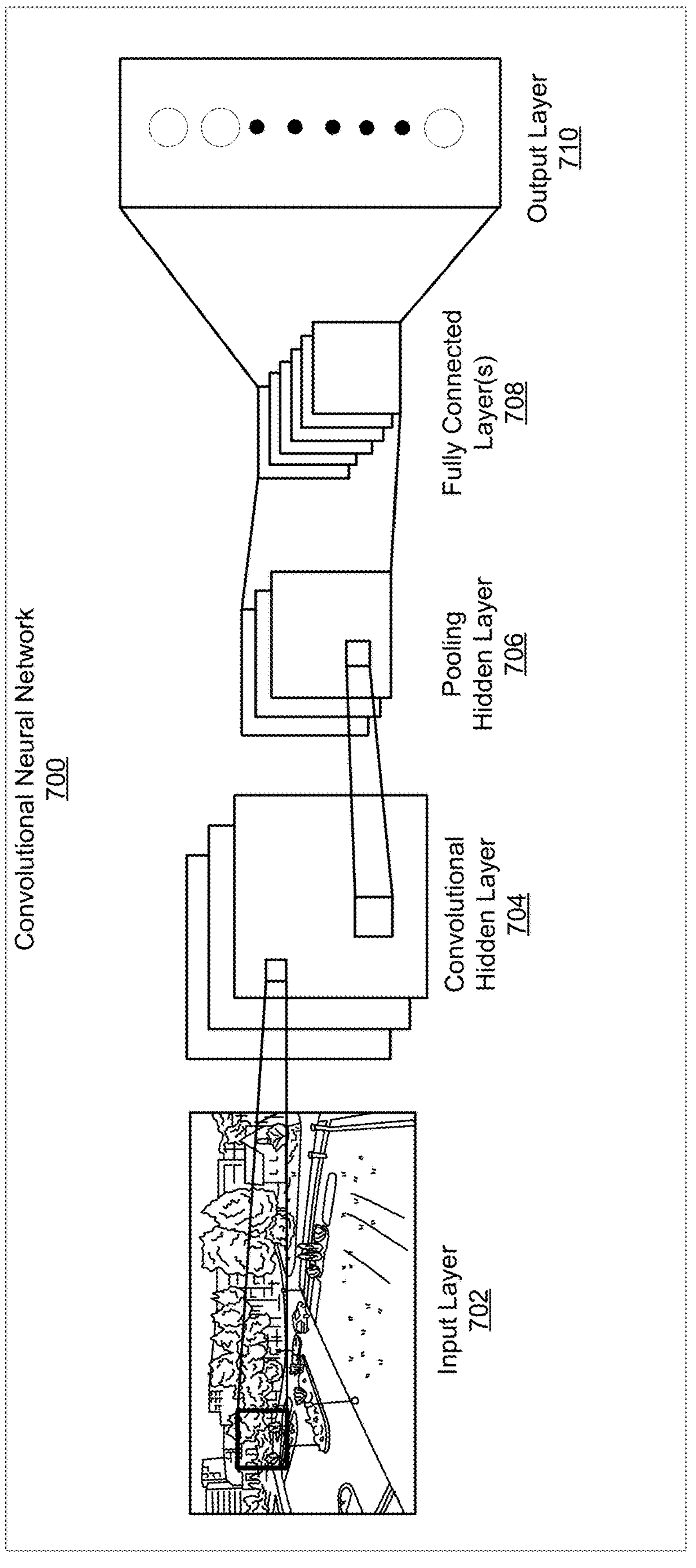
FIG. 7 is a block diagram illustrating an example of a convolutional neural network (CNN), according to various aspects of the present disclosure.

FIG. 7 is an illustrative example of a convolutional neural network (CNN) 700. The input layer 702 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 704, an optional non-linear activation layer, a pooling hidden layer 706, and fully connected layer 708 (which fully connected layer 708 can be hidden) to get an output at the output layer 710. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 can be the convolutional hidden layer 704. The convolutional hidden layer 704 can analyze image data of the input layer 702. Each node of the convolutional hidden layer 704 is connected to a region of nodes (pixels) of the input image called a receptive field. The convolutional hidden layer 704 can be considered as one or more filters (each filter corresponding to a different activation or feature map), with each convolutional iteration of a filter being a node or neuron of the convolutional hidden layer 704. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 704. Each connection between a node and a receptive field for that node learns a weight and, in some cases, an overall bias such that each node learns to analyze its particular local receptive field in the input image. Each node of the convolutional hidden layer 704 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 704 is due to each node of the convolutional layer being applied to its corresponding receptive field. For example, a filter of the convolutional hidden layer 704 can begin in the top-left corner of the input image array and can convolve around the input image. As noted above, each convolutional iteration of the filter can be considered a node or neuron of the convolutional hidden layer 704. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 704. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 704.

The mapping from the input layer to the convolutional hidden layer 704 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 704 can include several activation maps in order to identify multiple features in an image. The example shown in FIG. 7 includes three activation maps. Using three activation maps, the convolutional hidden layer 704 can detect three different kinds of features, with each feature being detectable across the entire image.

In some examples, a non-linear hidden layer can be applied after the convolutional hidden layer 704. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 700 without affecting the receptive fields of the convolutional hidden layer 704.

The pooling hidden layer 706 can be applied after the convolutional hidden layer 704 (and after the non-linear hidden layer when used). The pooling hidden layer 706 is used to simplify the information in the output from the convolutional hidden layer 704. For example, the pooling hidden layer 706 can take each activation map output from the convolutional hidden layer 704 and generates a condensed activation map (or feature map) using a pooling function. Max-pooling is one example of a function performed by a pooling hidden layer. Other forms of pooling functions be used by the pooling hidden layer 706, such as average pooling, L2-norm pooling, or other suitable pooling functions. A pooling function (e.g., a max-pooling filter, an L2-norm filter, or other suitable pooling filter) is applied to each activation map included in the convolutional hidden layer 704. In the example shown in FIG. 7, three pooling filters are used for the three activation maps in the convolutional hidden layer 704.

In some examples, max-pooling can be used by applying a max-pooling filter (e.g., having a size of 2×2) with a stride (e.g., equal to a dimension of the filter, such as a stride of 2) to an activation map output from the convolutional hidden layer 704. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 704 having a dimension of 24×24 nodes, the output from the pooling hidden layer 706 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 706 to every one of the output nodes in the output layer 710. Using the example above, the input layer includes 28×28 nodes encoding the pixel intensities of the input image, the convolutional hidden layer 704 includes 3×24×24 hidden feature nodes based on application of a 5×5 local receptive field (for the filters) to three activation maps, and the pooling hidden layer 706 includes a layer of 3×12×12 hidden feature nodes based on application of max-pooling filter to 2×2 regions across each of the three feature maps. Extending this example, the output layer 710 can include ten output nodes. In such an example, every node of the 3×12×12 pooling hidden layer 706 is connected to every node of the output layer 710.

The fully connected layer 708 can obtain the output of the previous pooling hidden layer 706 (which should represent the activation maps of high-level features) and determines the features that most correlate to a particular class. For example, the fully connected layer 708 can determine the high-level features that most strongly correlate to a particular class and can include weights (nodes) for the high-level features. A product can be computed between the weights of the fully connected layer 708 and the pooling hidden layer 706 to obtain probabilities for the different classes. For example, if the CNN 700 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 710 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
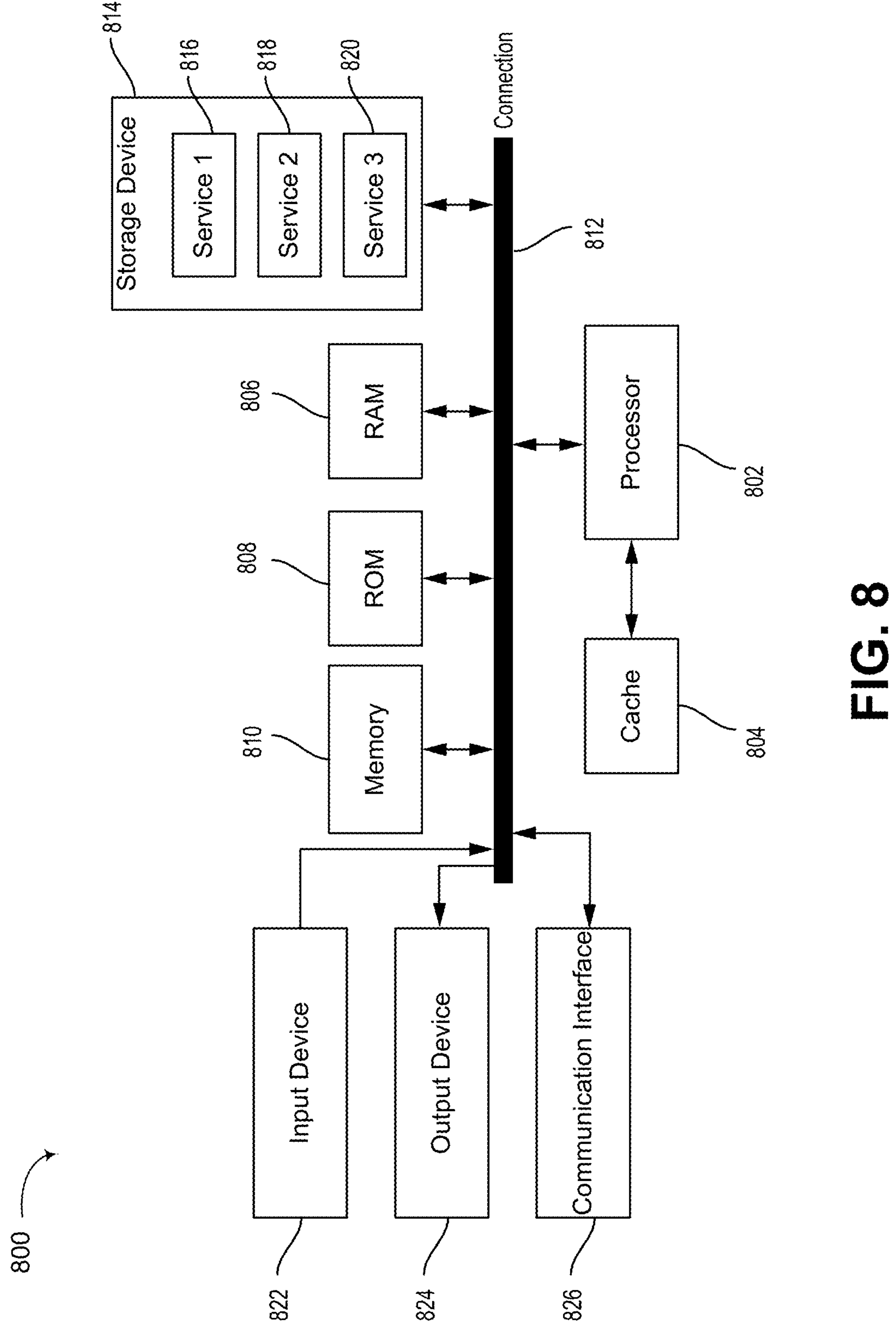
FIG. 8 is a block diagram illustrating an example computing-device architecture of an example computing device which can implement the various techniques described herein.

FIG. 8 illustrates an example computing-device architecture 800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 800 may include, implement, or be included in any or all of system 100, object detector 106, and/or object tracker 110 of FIG. 1, and/or system 300, CNN 304, transformer encoder 308, transformer decoder 314, detection transformer 318, bounding-box decoder 320, motion compensator 324, and/or combiner 332 of FIG. 3 and FIG. 4. Additionally or alternatively, computing-device architecture 800 may be configured to perform process 500, and/or other process described herein.

The components of computing-device architecture 800 are shown in electrical communication with each other using connection 812, such as a bus. The example computing-device architecture 800 includes a processing unit (CPU or processor) 802 and computing device connection 812 that couples various computing device components including computing device memory 810, such as read only memory (ROM) 808 and random-access memory (RAM) 806, to processor 802.

Computing-device architecture 800 can include a cache of high-speed memory connected directly with, in close proximity to, or integrated as part of processor 802. Computing-device architecture 800 can copy data from memory 810 and/or the storage device 814 to cache 804 for quick access by processor 802. In this way, the cache can provide a performance boost that avoids processor 802 delays while waiting for data. These and other modules can control or be configured to control processor 802 to perform various actions. Other computing device memory 810 may be available for use as well. Memory 810 can include multiple different types of memory with different performance characteristics. Processor 802 can include any general-purpose processor and a hardware or software service, such as service 1 816, service 2 818, and service 3 820 stored in storage device 814, configured to control processor 802 as well as a special-purpose processor where software instructions are incorporated into the processor design. Processor 802 may be a self-contained system, containing multiple cores or processors, a bus, memory controller, cache, etc. A multi-core processor may be symmetric or asymmetric.

To enable user interaction with the computing-device architecture 800, input device 822 can represent any number of input mechanisms, such as a microphone for speech, a touch-sensitive screen for gesture or graphical input, keyboard, mouse, motion input, speech and so forth. Output device 824 can also be one or more of a number of output mechanisms known to those of skill in the art, such as a display, projector, television, speaker device, etc. In some instances, multimodal computing devices can enable a user to provide multiple types of input to communicate with computing-device architecture 800. Communication interface 826 can generally govern and manage the user input and computing device output. There is no restriction on operating on any particular hardware arrangement and therefore the basic features here may easily be substituted for improved hardware or firmware arrangements as they are developed.

Storage device 814 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 806, read only memory (ROM) 808, and hybrids thereof. Storage device 814 can include services 816, 818, and 820 for controlling processor 802. Other hardware or software modules are contemplated. Storage device 814 can be connected to the computing device connection 812. In one aspect, a hardware module that performs a particular function can include the software component stored in a computer-readable medium in connection with the necessary hardware components, such as processor 802, connection 812, output device 824, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

Illustrative aspects of the disclosure include:

Aspect 1. An apparatus for tracking objects, the apparatus comprising: at least one memory; and at least one processor coupled to the at least one memory and configured to: generate an output embedding based on an object in a first image; obtain a predicted position of the object in a second image; modify the output embedding based on the predicted position to generate a modified output embedding; and detect the object in the second image based on the modified output embedding.

Aspect 2. The apparatus of aspect 1, wherein: the output embedding comprises a first output embedding, and to detect the object in the second image, the at least one processor is configured to: provide the second image and the modified output embedding to an object-detection machine-learning model; and receive, from the object-detection machine-learning model, a second output embedding based on the second image and the modified output embedding.

Aspect 3. The apparatus of any one of aspects 1 or 2, wherein the at least one processor is further configured to: provide the second output embedding to a decoder; and receive, from the decoder, image coordinates corresponding to the object in the second image based on the second output embedding.

Aspect 4. The apparatus of aspect 3, wherein the image coordinates are indicative of a bounding box associated with the object.

Aspect 5. The apparatus of any one of aspects 2 to 4, wherein the modified output embedding is provided to the object-detection machine-learning model as a query.

Aspect 6. The apparatus of any one of aspects 2 to 5, wherein the object-detection machine-learning model comprises a detection transformer.

Aspect 7. The apparatus of any one of aspects 2 to 6, wherein the object-detection machine-learning model comprises: a convolutional neural network (CNN) to generate features based on images; a transformer encoder to generate image features based on the features; and a transformer decoder to generate output embeddings based on the image features and queries.

Aspect 8. The apparatus of any one of aspects 1 to 7, wherein the at least one processor is further configured to decode, using a decoder, the output embedding to generate first image coordinates corresponding to the object in the first image, wherein the predicted position of the object in the second image comprises second image coordinates corresponding to the predicted position of the object in the second image; and wherein, to modify the output embedding, the at least one processor is configured to determine a modification to the output embedding that results in the modified output embedding being decodable by the decoder to generate the second image coordinates.

Aspect 9. The apparatus of aspect 8, wherein the decoder comprises a linear predictor configured to generate image coordinates based on output embeddings.

Aspect 10. The apparatus of any one of aspects 8 or 9, wherein the modification to the output embedding is determined based on a least-norm solution to an undetermined linear equation system, and wherein the undetermined linear equation system is based on the decoder.

Aspect 11. The apparatus of any one of aspects 8 to 10, wherein the modification to the output embedding is determined using a gradient-descent technique.

Aspect 12. The apparatus of any one of aspects 8 to 11, wherein the first image coordinates are indicative of a first bounding box associated with the object and wherein the second image coordinates are indicative of a second bounding box associated with the object.

Aspect 13. The apparatus of any one of aspects 1 to 12, wherein: the output embedding comprises a first output embedding; the predicted position comprises a first predicted position; the modified output embedding comprises a first modified output embedding; and to detect the object in the second image, the at least one processor is configured to generate a second output embedding based on the object in the second image; the at least one processor is further configured to: obtain a second predicted position of the object in a third image; modify the second output embedding based on the second predicted position to generate a second modified output embedding; and detect the object in a third image based on the second modified output embedding.

Aspect 14. The apparatus of any one of aspects 1 to 13, wherein the output embedding is associated with detection of the object in the first image.

Aspect 15. The apparatus of any one of aspects 1 to 14, wherein, to generate the output embedding, the at least one processor is configured to: provide the first image to an object-detection machine-learning model; and receive, from the object-detection machine-learning model, the output embedding based on the first image.

Aspect 16. The apparatus of aspect 15, wherein the object-detection machine-learning model comprises a detection transformer.

Aspect 17. The apparatus of any one of aspects 15 or 16, wherein the object-detection machine-learning model comprises: a convolutional neural network (CNN) to generate features based on images; a transformer encoder to generate image features based on the features; and a transformer decoder to generate output embeddings based on the image features and queries.

Aspect 18. The apparatus of any one of aspects 1 to 17, wherein the predicted position of the object in the second image is based on relative motion data.

Aspect 19. The apparatus of aspect 18, wherein the relative motion data is based on at least one of ego-motion data that is indicative of motion of a camera associated with the first image and the second image or object-motion data that is indicative of motion of the object.

Aspect 20. The apparatus of any one of aspects 1 to 19, wherein the at least one processor is further configured to determine a position of the object in the first image, wherein the predicted position of the object in the second image is based on the position of the object in the first image.

Aspect 21. The apparatus of aspect 20, wherein the at least one processor is further configured to: determine a relative position of the object relative to a camera associated with the first image based on the position of the object in the first image; and generate the predicted position of the object in the second image based on the relative position of the object.

Aspect 22. The apparatus of aspect 21, wherein the predicted position of the object in the second image is further based on at least one of ego-motion data that is indicative of motion of a camera associated with the first image and the second image or object-motion data that is indicative of motion of the object.

Aspect 23. The apparatus of any one of aspects 1 to 22, wherein the predicted position of the object in the second image is based on at least one of: a position of the object in the first image; a relative position of the object relative to a camera associated with the first image and the second image; ego-motion data indicative of motion of the camera associated with the first image and the second image; or object-motion data indicative of motion of the object.

Aspect 24. A method for tracking objects, the method comprising: generating an output embedding based on an object in a first image; obtaining a predicted position of the object in a second image; modifying the output embedding based on the predicted position to generate a modified output embedding; and detecting the object in the second image based on the modified output embedding.

Aspect 25. The method of aspect 24, wherein: the output embedding comprises a first output embedding, and detecting the object in the second image comprises: providing the second image and the modified output embedding to an object-detection machine-learning model; and receiving, from the object-detection machine-learning model, a second output embedding based on the second image and the modified output embedding.

Aspect 26. The method of aspect 25, further comprising: providing the second output embedding to a decoder; and receiving, from the decoder, image coordinates corresponding to the object in the second image based on the second output embedding.

Aspect 27. The method of aspect 26, wherein the image coordinates are indicative of a bounding box associated with the object.

Aspect 28. The method of any one of aspects 25 to 27, wherein the modified output embedding is provided to the object-detection machine-learning model as a query.

Aspect 29. The method of any one of aspects 25 to 28, wherein the object-detection machine-learning model comprises a detection transformer.

Aspect 30. The method of any one of aspects 25 to 29, wherein the object-detection machine-learning model comprises: a convolutional neural network (CNN) to generate features based on images; a transformer encoder to generate image features based on the features; and a transformer decoder to generate output embeddings based on the image features and queries.

Aspect 31. The method of any one of aspects 24 to 30, further comprising: decoding, using a decoder, the output embedding to generate first image coordinates corresponding to the object in the first image, wherein the predicted position of the object in the second image comprises second image coordinates corresponding to the predicted position of the object in the second image; and modifying the output embedding comprises determining a modification to the output embedding that results in the modified output embedding being decodable by the decoder to generate the second image coordinates.

Aspect 32. The method of aspect 31, wherein the decoder comprises a linear predictor configured to generate image coordinates based on output embeddings.

Aspect 33. The method of any one of aspects 31 or 32, wherein the modification to the output embedding is determined based on a least-norm solution to an undetermined linear equation system, and wherein the undetermined linear equation system is based on the decoder.

Aspect 34. The method of any one of aspects 31 to 33, wherein the modification to the output embedding is determined using a gradient-descent technique.

Aspect 35. The method of any one of aspects 31 to 34, wherein the first image coordinates are indicative of a first bounding box associated with the object and wherein the second image coordinates are indicative of a second bounding box associated with the object.

Aspect 36. The method of any one of aspects 24 to 35, wherein: the output embedding comprises a first output embedding; the predicted position comprises a first predicted position; the modified output embedding comprises a first modified output embedding; and detecting the object in the second image comprises generating a second output embedding based on the object in the second image; the method further comprising: obtaining a second predicted position of the object in a third image; modifying the second output embedding based on the second predicted position to generate a second modified output embedding; and detecting the object in a third image based on the second modified output embedding.

Aspect 37. The method of any one of aspects 24 to 36, wherein the output embedding is associated with detection of the object in the first image.

Aspect 38. The method of any one of aspects 24 to 37, wherein generating the output embedding comprises: providing the first image to an object-detection machine-learning model; and receiving, from the object-detection machine-learning model, the output embedding based on the first image.

Aspect 39. The method of aspect 38, wherein the object-detection machine-learning model comprises a detection transformer.

Aspect 40. The method of any one of aspects 38 or 39, wherein the object-detection machine-learning model comprises: a convolutional neural network (CNN) to generate features based on images; a transformer encoder to generate image features based on the features; and a transformer decoder to generate output embeddings based on the image features and queries.

Aspect 41. The method of any one of aspects 24 to 40, wherein the predicted position of the object in the second image is based on relative motion data.

Aspect 42. The method of aspect 41, wherein the relative motion data is based on at least one of ego-motion data that is indicative of motion of a camera associated with the first image and the second image or object-motion data that is indicative of motion of the object.

Aspect 43. The method of any one of aspects 24 to 42, further comprising determining a position of the object in the first image, wherein the predicted position of the object in the second image is based on the position of the object in the first image.

Aspect 44. The method of aspect 43, further comprising: determining a relative position of the object relative to a camera associated with the first image based on the position of the object in the first image; and generating the predicted position of the object in the second image based on the relative position of the object.

Aspect 45. The method of aspect 44, wherein the predicted position of the object in the second image is further based on at least one of ego-motion data that is indicative of motion of a camera associated with the first image and the second image or object-motion data that is indicative of motion of the object.

Aspect 46. The method of any one of aspects 24 to 45, wherein the predicted position of the object in the second image is based on at least one of: a position of the object in the first image; a relative position of the object relative to a camera associated with the first image and the second image; ego-motion data indicative of motion of the camera associated with the first image and the second image; or object-motion data indicative of motion of the object.

Aspect 47. A non-transitory computer-readable storage medium having stored thereon instructions that, when executed by at least one processor, cause the at least one processor to perform operations according to any of aspects 24 to 46.

Aspect 48. An apparatus for providing virtual content for display, the apparatus comprising one or more means for perform operations according to any of aspects 24 to 46.

What is claimed is:

1. An apparatus for tracking objects, the apparatus comprising:

at least one memory; and at least one processor coupled to the at least one memory and configured to:

generate a first output embedding based on an object in a first image;

obtain a first predicted position of the object in a second image;

modify the first output embedding based on the first predicted position to generate a first modified output embedding;

generate a second output embedding based on the object in the second image and the first modified output embedding;

detect the object in the second image based on the second output embedding;

obtain a second predicted position of the object in a third image;

modify the second output embedding based on the second predicted position to generate a second modified output embedding;

generate a third output embedding based on the object in the third image and the second modified-output embedding; and detect the object in a third image based on the third output embedding.

2. The apparatus of claim 1, wherein, to generate the second output embedding, the at least one processor is configured to:

provide the second image and the first modified output embedding to an object-detection machine-learning model; and receive, from the object-detection machine-learning model, a second output embedding based on the second image and the first modified output embedding.

3. The apparatus of claim 2, wherein, to detect the object in the second image, the at least one processor is further configured to:

provide the second output embedding to a decoder; and receive, from the decoder, image coordinates corresponding to the object in the second image based on the second output embedding.

4. The apparatus of claim 3, wherein the image coordinates are indicative of a bounding box associated with the object.

5. The apparatus of claim 2, wherein the at least one processor is configured to provide the first modified output embedding to the object-detection machine-learning model as a query.

6. The apparatus of claim 2, wherein the object-detection machine-learning model comprises a detection transformer.

7. The apparatus of claim 2, wherein the object-detection machine-learning model comprises:

a convolutional neural network (CNN) to generate features based on images;

a transformer encoder to generate image features based on the features; and a transformer decoder to generate output embeddings based on the image features and queries.

8. The apparatus of claim 1, wherein the at least one processor is further configured to decode, using a decoder, the first output embedding to generate first image coordinates corresponding to the object in the first image, wherein the first predicted position of the object in the second image comprises second image coordinates corresponding to the first predicted position of the object in the second image; and wherein, to modify the first output embedding, the at least one processor is configured to determine a modification to the first output embedding that results in the first modified output embedding being decodable by the decoder to generate the second image coordinates.

9. The apparatus of claim 8, wherein the decoder comprises a linear predictor configured to generate image coordinates based on output embeddings.

10. The apparatus of claim 8, wherein the modification to the first output embedding is determined based on a least-norm solution to an undetermined linear equation system, and wherein the undetermined linear equation system is based on the decoder.

11. The apparatus of claim 8, wherein the modification to the first output embedding is determined using a gradient-descent technique.

12. The apparatus of claim 8, wherein the first image coordinates are indicative of a first bounding box associated with the object and wherein the second image coordinates are indicative of a second bounding box associated with the object.

13. The apparatus of claim 1, wherein the first output embedding is associated with detection of the object in the first image.

14. The apparatus of claim 1, wherein, to generate the first output embedding, the at least one processor is configured to:

provide the first image to an object-detection machine-learning model; and receive, from the object-detection machine-learning model, the first output embedding based on the first image.

15. The apparatus of claim 14, wherein the object-detection machine-learning model comprises a detection transformer.

16. The apparatus of claim 14, wherein the object-detection machine-learning model comprises:

a convolutional neural network (CNN) to generate features based on images;

a transformer encoder to generate image features based on the features; and a transformer decoder to generate output embeddings based on the image features and queries.

17. The apparatus of claim 1, wherein the first predicted position of the object in the second image is based on relative motion data.

18. The apparatus of claim 17, wherein the relative motion data is based on at least one of ego-motion data that is indicative of motion of a camera associated with the first image and the second image or object-motion data that is indicative of motion of the object.

19. The apparatus of claim 1, wherein the at least one processor is further configured to determine a position of the object in the first image, wherein the first predicted position of the object in the second image is based on the position of the object in the first image.

20. The apparatus of claim 19, wherein the at least one processor is further configured to:

determine a relative position of the object relative to a camera associated with the first image based on the position of the object in the first image; and generate the first predicted position of the object in the second image based on the relative position of the object.

21. The apparatus of claim 20, wherein the first predicted position of the object in the second image is further based on at least one of ego-motion data that is indicative of motion of a camera associated with the first image and the second image or object-motion data that is indicative of motion of the object.

22. The apparatus of claim 1, wherein the first predicted position of the object in the second image is based on at least one of:

a position of the object in the first image;

a relative position of the object relative to a camera associated with the first image and the second image;

ego-motion data indicative of motion of the camera associated with the first image and the second image; or object-motion data indicative of motion of the object.

23. A method for tracking objects, the method comprising:

generating a first output embedding based on an object in a first image;

obtaining a first predicted position of the object in a second image;

modifying the first output embedding based on the first predicted position to generate a first modified output embedding;

generating a second output embedding based on the object in the second image and the first modified-output embedding;

detecting the object in the second image based on the modified second output embedding;

obtaining a second predicted position of the object in a third image;

modifying the second output embedding based on the second predicted position to generate a second modified output embedding;

generating a third output embedding based on the object in the third image and the second modified-output embedding; and detecting the object in a third image based on the third output embedding.

24. The method of claim 23, wherein generating the second output embedding comprises:

providing the second image and the first modified output embedding to an object-detection machine-learning model; and receiving, from the object-detection machine-learning model, a second output embedding based on the second image and the first modified output embedding.

25. The method of claim 24, wherein detecting the object in the second image comprises:

providing the second output embedding to a decoder; and receiving, from the decoder, image coordinates corresponding to the object in the second image based on the second output embedding.

26. The method of claim 25, wherein the image coordinates are indicative of a bounding box associated with the object.

27. The method of claim 24, further comprising providing the first modified output embedding to the object-detection machine-learning model as a query.

28. The method of claim 24, wherein the object-detection machine-learning model comprises a detection transformer.

29. The method of claim 24, wherein the object-detection machine-learning model comprises:

a convolutional neural network (CNN) to generate features based on images;

a transformer encoder to generate image features based on the features; and a transformer decoder to generate output embeddings based on the image features and queries.

* * * * *